Oct. 11, 1960     E. E. SCHWENZFEGER     2,956,265

TRANSLATOR

Filed March 19, 1957

INVENTOR
E. E. SCHWENZFEGER
BY R. C. Terry
ATTORNEY

United States Patent Office 2,956,265
Patented Oct. 11, 1960

2,956,265

TRANSLATOR

Edward E. Schwenzfeger, Bayside, N.Y., assignor to Bell Telephone Laboratories, Incorporated, New York, N.Y., a corporation of New York Filed Mar. 19, 1957, Ser. No. 646,998

8 Claims. (Cl. 340—173.2)

This invention relates to electrical circuit means for translating coded information, and more particularly, to such a circuit employing ferroelectric elements.

Among the many translating circuits used in the art today, "logic circuits" take a very important place. These circuits are generally employed to translate information in accordance with a particular code from a bit or element form into some other form. Such translating circuits have in the past commonly employed diodes or electron tube circuits. Among the requirements of such circuits are a continuous power drain, even during periods when the actual circuit is not being used, selectivity with respect to the levels of the input, and the need for a particular timing of the inputs. An example of the latter requirement is the need for coincidence of the input pulses when using diode AND gates. Another feature not to be overlooked is the considerable space requirements which may arise when such equipment is used.

Advantageous improvements in such logic circuit means are therefore seen to include a translating means which requires no power other than that inherent in the input thereto, rather broad limits as to the actual nature of the inputs, low selectivity as to the time of application of such inputs, and the requirement of a minimum amount of space for accommodation. In regard to the question of simultaneous inputs to AND circuits, obviously the nature of the equipment concerned and the duration between transmissions of information pulses make desirable the ability of such a circuit to assimilate and store information whenever received in order that it may act upon it in the future.

The advent of ferroelectric substances makes possible the provision of logic circuits capable of storing input information without requiring the continuous application of power. As is well known, these substances when exposed to an alternating polarizing voltage exhibit a relationship between electrostatic polarizing force and polarization in the direction thereof, similar to the hysteresis loop exhibited by ferromagnetic materials. It may be noted that this property of electrostatic hysteresis is characteristic of a number of piezoelectric substances, examples being: barium titanate, rochelle salt, potassium dihydrogen phosphate, potassium niobate, and sodium niobate.

An object of the present invention is to provide improved translating means for producing a discrete output in response to a complement of inputs.

Another object of the present invention is to provide such a translating means which does not require that the individual inputs in the complete complement be applied simultaneously.

Still another object of the present invention is to provide translating means having the property of storage and thereby permitting the application of inputs at any time.

A further object of the present invention is to provide a translating means requiring neither supply voltage nor any other form of power, other than the input, to provide a usable output.

A more specific object of the present invention is to furnish a compact, efficient, and economical translating means utilizing the properties of ferroelectric materials.

Another specific object of the present invention is to provide means for interpreting information appearing on a predetermined number of leads out of a plurality of such leads, in accordance with a particular plan or code.

There are three prominant properties of ferroelectric crystals utilized by the present invention. The first is a property manifested when two or more such crystals are connected in series. In such a configuration the crystals cannot be switched unless they are initially polarized in the same direction. Utilization of this property makes possible the isolation of a plurality of inputs by connecting together one side of a plurality of crystals and polarizing them all in the same direction. A second important property is that such crystals, while switching, exhibit a potential drop which does not exceed the coercive potential of the crystal. A rough order of magnitude for this coercive potential may be taken as ten volts; however, the actual magnitude is of no import in the operation of the present invention. The third important property herein employed is that the amount of charge made available during switching of a crystal is directly proportional to the electrode area thereon.

A feature of the present invention resides in the utilization of a plurality of ferroelectric crystals, each having a unit area, in combination with a single crystal having a total area of one unit less than the sum of the areas of the plurality, thereby providing an AND logic circuit. In another aspect, the present invention contemplates the use of a single ferroelectric crystal upon which a plurality of input electrodes and a single tank electrode are mounted.

An illustrative embodiment of this invention features means, including ferroelectric capacitors, for decoding information appearing on a predetermined number of leads of a plurality of such leads.

The foregoing, as well as additional objects and features will be more clearly understood and appreciated from the following description to be considered in connection with the drawing wherein.

Figure 1:
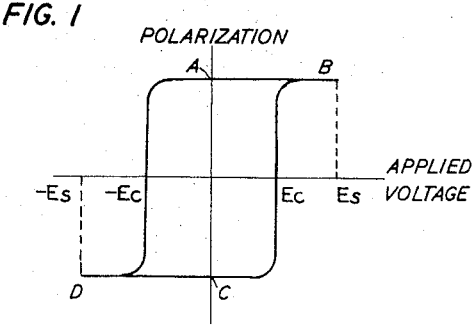
Fig. 1 illustrates an electostatic hysteresis loop of the nature exhibited by the crystals employed in this invention.

Referring to Fig. 1, it will be noted that four points on the abscissa are labeled. These points correspond to the positive and negative coercive potentials, $Ec$ and $-Ec$ and the saturation potentials, $Es$ and $-Es$. The operation of a ferroelectric crystal in respect to switching polarization is analogous to that experienced with magnetic materials exhibiting hysteresis loops. If it is assumed that the crystal is initially positively polarized, its state of polarization may be represented as being at point A on the curve. Application of a positive voltage of the order of $Es$ causes the state of polarization to traverse the curve from point A to point B and upon cessation of such voltage, to return to point A. Traversing the curve in this fashion does not give rise to any charge. When a negative potential of magnitude $-Es$ or greater is applied, however, the curve is traversed from point A to point D, the polarization thereby reversing and producing an amount of charge determined by the characteristics of the crystal. Here, upon cessation of applied voltage, the state of polarization traverses the curve from point D to point C and remains there until a voltage is again applied. In this polarized state, subsequent application of negative voltages will have no effect upon the polarity of the polarization. It is therefore seen that once a crystal is switched, further applications of the same polarity of voltage have no material effect upon its state. The actual time of switching is determined by three factors; crystal thickness, load impedance, and applied voltage. Switching time increases exponentially as the crystal thickness increases, linearly as the load impedance increases, and slightly as the applied voltage decreases. Where an ideal hysteresis loop is assumed, the increase in applied voltage above the saturation potential will have no effect however.

Figure 3:
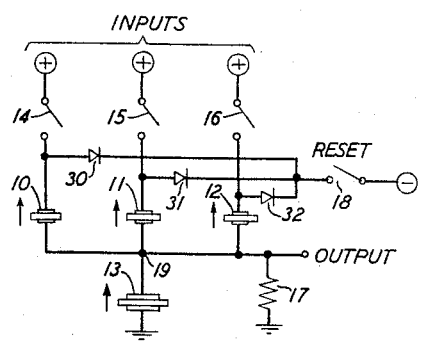
Fig. 3 is a schematic representation of a circuit employing ferroelectric crystals and also designed to operate as a three input AND gate.

A logic AND circuit employing the hereinbefore mentioned properties of ferroelectric materials is shown in Fig. 3. This circuit is designed to provide an output when an input has appeared on all three input leads. The circuit itself is seen to comprise a positive source of voltage, a plurality of switches 14, 15, and 16, and a plurality of ferroelectric crystals 10, 11, and 12, respectively connected in series with each switch, the opposite electrodes being connected in common to point 19. Each of these crystals has a unit electrode area $a$. Ferroelectric crystal 13, having electrode area $2a$, is interposed between common connection 19 and ground, and in parallel therewith is load impedance 17. In addition, reset switch 18 is connected to each of crystals 10, 11, and 12 on their input sides via diodes 30, 31, and 32 respectively. Initially, each crystal is assumed to be negatively polarized as has been indicated by the arrows adjacent thereto. Recalling the preceding discussion of the electrostatic hysteresis loop, it is therefore evident that application of a positive potential of sufficient magnitude will switch the polarization of these crystals.

Closing switch 14 will apply the positive potential connected thereto, which may be any voltage greater than twice the coercive potential of the crystals, across ferroelectric crystals 10 and 13; completely switching crystal 10 and, due to the electrode area of crystal 13, effectively switching only one-half of the latter crystal. Due to the polarization of crystals 11 and 12, they will be unaffected by the positive potential appearing at point 19, while crystal 13 is switching or partially switching. As has been previously mentioned, this output voltage will be equivalent to the coercive potential $Ec$. Switch 14 may be reopened without further polarizing effect. Closing switch 15 and thereby applying the positive voltage connected thereto across crystals 11 and 13 in series will cause crystal 11 to switch completely and, in addition, complete the switching of crystal 13. It is evident that due to the storage and integrating features of ferroelectric crystals, utilization of a crystal such as crystal 13 having an area which is a multiple of the areas existing upon such crystals as 10 and 11, makes possible the counting of the number of inputs which have been energized. Finally, closing switch 16 applies the positive voltage connected thereto to ferroelectric crystal 12, in so doing, switching it and producing a charge Q. Because ferroelectric crystal 13 has now been completely reversed in polarity, the charge Q finds only the path containing resistor 17 through which to reach ground. It may be noted that although this path had continuously shunted crystal 13, due to its high impedance in conjunction with the low impedance of a properly polarized crystal, it had previously no effect upon the switching operation. However, the effectively infinite impedance of ferroelectric crystal 13 when fully switched, leaves resistance 17 as the only remaining path. The voltage dissipated across resistance 17 will exceed the coercive potential $Ec$ and vary directly as the magnitude of the resistance.

Before the circuit may be again operated, it will be necessary to reset the crystals. This may be done by applying a negative potential to each input, such as occurs when reset switch 18 is closed. Closure of this switch applies a negative potential to the input side of each crystal via its respective diode, thus switching the crystals back to their initial state of polarization. It should be noted that in the operation described, each input was applied only for a brief time after which the input circuit was disconnected. It should also be noted that the inputs were not applied either simultaneously or coincidently. The logic device employed herein is also capable of operations wherein the inputs appear simultaneously or concurrently, and with such operation, the same or other means of resetting the crystals may be employed. For example, the crystals may be continuously biased through a resistance by a negative voltage, thereby maintaining the crystals in an initial state of polarization at all times except during translating, during which time the applied positive pulse or voltage would switch the crystals momentarily.

Among other pertinent points to be noted with respect to the above-described circuit is that the inputs may be pulses having durations as low as one microsecond, depending upon the physical construction of the crystals involved. Another point is that the effectively infinite back impedance of ferroelectric crystals, once switched, makes possible the unlimited multipling of these circuits. Further, there is no upper limit upon the potential of the applied pulse, the only requirment being that it exceed the sum of the coercive potentials of the crystals which are to be switched in series.

Figure 2:
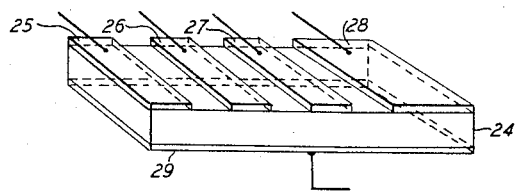
Fig. 2 is a pictorial representation of a ferroelectric crystal designed for use as a three input AND gate.

Fig. 2 is a pictorial representation of a variation of the logic element of this invention. It comprises a single slab of ferroelectric material 24, a plurality of small electrodes 25, 26, and 27, a large electrode 28, and common electrode 29. The small electrodes each have a unit area and the large or tank electrode 28 has an area equal to one unit less than the sum of the areas of the small electrodes. Thus, in keeping with the circuit previously described, electrodes 25, 26, and 27 have unit areas $a$ while electrode 28 has an area $2a$. Common electrode 29 may cover the entire face of slab 24 or merely those areas directly opposite to the other electrodes. In operation this device functions as three unit area crystals and a single tank crystal similar to that shown and described in connection with Fig. 3.

Figure 4:
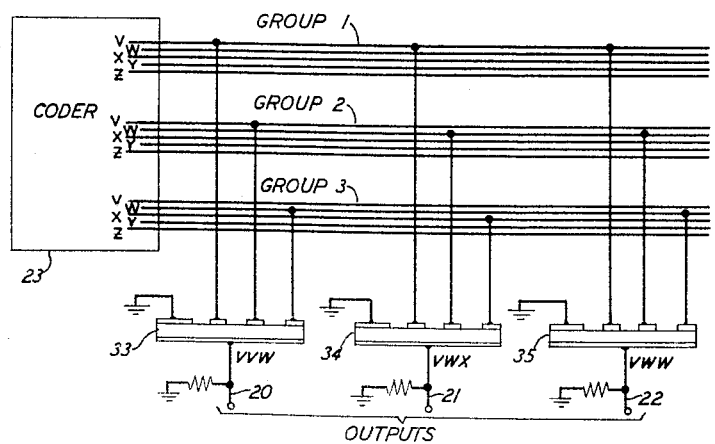
Fig. 4 shows an illustrative embodiment of the present invention making possible the translation of information appearing as a three digit code on three groups of similar lines.

Consideration of the logic means of this invention in a particular translating circuit will clearly indicate the advantages which may be realized through their utilization. Fig. 4 will be seen to comprise groups of conductors, each group containing five separate conductors. For convenience, these conductors have been labeled V, W, X, Y, and Z. A similar arrangement containing more or fewer groups and more conductors per group may be found in teletypewriter switching systems. For instance, Patent 2,430,447, granted to D. E. Branson et al. on November 11, 1947, discloses a translator system comprising two groups, with twenty conductors per group, reference being had to Figs. 32 and 33. It is assumed that by means of these conductors a code will be received which contains three elements, any one of which may represent the alphabetical notations V, W, X, Y, or Z. The output of this arrangement therefore may consist of 125 distinct designations, or combinations, for the decoding and identification of which a like number of AND gates may be employed. For illustrative purposes, only three such gates, 33, 34, and 35, are shown. The selection responsive to a particular character is performed by temporarily energizing the conductor representative thereof; for instance, if the first character is to be V, conductor V of group 1 will be energized.

For a more concrete example, assume that output 20 is to be energized when a signal designated VVW is received. The following conductors must be energized: in group 1, conductor V; in group 2, conductor V; and in group 3, conductor W. It should be understood that the energization of these conductors may be either by a pulse or a steady voltage. The description of the properties exhibited by the ferroelectric AND gate of this inventon make it apparent that its utilization in translating a code of the nature suggested provides an efficient translating system and does not require coincidence of the signal inputs. When conductor V of group 1 is energized, portions of crystals 33, 34, and 35 associated with output 20, output 21, and output 22 are switched. Similarly, when conductor V of group 2 is energized, an additional portion of crystal 33 is switched. Clearly, the crystals 34 and 35 are not affected because they are not connected to conductor V of group 2. When conductor W of group 3 is energized, the crystal 33, having received switching potentials at all input electrodes, will produce an output pulse for the reasons described in connection with Fig. 3. This output pulse is indicative of reception of signal VVW. It should be noted that crystal 35 associated with output 22 is also additionally partially switched when conductor W of group 3 is energized. However, no appreciable output occurs at 22 due to the characteristics of the ferroelectric AND gate. Following the transmission of each signal designation, all crystals are reset by applying a voltage or pulse of a polarity opposite to that used for signal transmission. For illustrative purposes, coder 23 may comprise circuitry of the nature utilized to provide inputs for Fig. 3, i.e., a voltage supply and individual switches for each line. Any other means may be employed, however, which provide either a pulse or voltage of sufficient magnitude to switch the associated AND gate.

There is no limitation upon the number of elements in a particular signal, nor the number of characters each element may assume. This is due to the effectively infinite back impedance of the ferroelectric AND gates employed and the fact that they do not consume appreciable power when not switching. Unlike conventional gates, thousands of this type of gate may be employed in multiple.

By the simple expedient of making the electrode area of crystal 13 equivalent to the area of crystals 10, 11, or 12, it is also possible to employ the principles above considered to construct a ferroelectric OR gate, the only requirement being that to enable the gate, one crystal must first be switched. Thus, assuming all crystals to have a unit area, in order to set the gate, crystals 10 and 13 would initially be switched in series and the subsequent appearance of an input to crystals 11 or 12 would cause an appreciable output.

The above description serves merely to illustrate the principles involved in the present invention and as utilized in a particular embodiment. It is to be understood that numerous changes may be made by those skilled in the art without departing from the spirit and teaching of this invention and for that reason, there is no intention of limiting it to the embodiment illustrated herein.

What is claimed is:

1. A translating circuit comprising in combination, a first source of potential, a plurality of unit area ferroelectric crystals, means for independently applying said first source of potential to one side of each of said unit area crystals, a second source of potential, means for applying said second source of potential to said one side of each of said unit area crystals, a common junction between the other sides of each of said crystals, a ferroelectric crystal connected between said common junction and a fixed potential having an area one unit less than the total area of all of said plurality of crystals, and output means connected between said common junction and said fixed potential.

2. A translating circuit comprising in combination, a plurality of unit area ferroelectric crystals having an initial polarization, means for individually switching said initial polarization of each of said crystals, a common junction between one side of each of said crystals, a single ferroelectric crystal interposed between said common junction and a fixed potential having an area one unit less than the total area of all of said plurality of crystals and having said initial polarization, output means shunting said single crystal, and means for simultaneously setting all of said crystals to said initial polarization.

3. A translating circuit comprising in combination, a plurality of capacitors having dielectrics of a ferroelectric material exhibiting an initial polarization and electrode areas equal to one unit, a single capacitor having a dielectric of a ferroelectric material exhibiting said initial polarization and an electrode area equal to one unit less than the sum of the electrode areas of said plurality of capacitors, a common junction between oppositely polarized terminals of said plurality of capacitors and said single capacitor, means for individually switching said initial polarization of each of said plurality of capacitors in series with said single capacitor, independent means for resetting said crystals to said initial polarization, and an output impedance shunting said single capacitor.

4. A ferroelectric logic circuit comprising in combination, a single piece of ferroelectric material having a first face and a second face opposed to said first face, a plurality of input electrodes, each of said electrodes having a unit area on said first face, a tank electrode on said first face, said tank electrode having an area equivalent to the sum of said unit areas minus one of said unit areas, a common output electrode on said second face, means for simultaneously polarizing the areas between said electrodes on said opposed faces in the same direction, and means for selectively applying voltage pulses to each of said input electrodes and said tank electrode in series to selectively change the polarization of the areas between said electrodes on said opposed faces.

5. In a translator circuit, a plurality of sets of conductors, a plurality of gate devices each comprising in turn a plurality of initially polarized unit area ferroelectric capacitors equal in number to said sets of conductors, each of said capacitors connected selectively to one of the conductors of a set, a common junction between each unit area capacitor in each gate device, an initially polarized multiunit area ferroelectric capacitor in each gate device connected between said common junction and a fixed potential, said multiunit area capacitor having an electrode area one unit less than the sum of the electrode areas of the unit area capacitors in said gate device, means for electrically conditioning one conductor of each of said sets of conductors with respect to said fixed potential to selectively enable the gate device whose unit area capacitors are all connected to said conditioned conductors, and means for electrically conditioning said conductors with respect to said fixed potential to return all capacitors connected thereto to said initial polarization.

6. A translator circuit as defined in claim 5 wherein all of said ferroelectric capacitors in a gate device utilize a single slab of ferroelectric material for their dielectric.

7. A decoding arrangement comprising in combination, a plurality of conductors, means for electrically conditioning said conductors in accordance with a predetermined code, a plurality of gate devices each individually comprising a plurality of unit electrode area ferroelectric capacitors having an initial polarization, individual unit area capacitors of each gate device being selectively connected to one of said conductors and switchable in response to the electrical conditioning thereof, a common junction between the ferroelectric capacitors in each gate device, a single ferroelectric capacitor in each gate device interposed between said common junction and a fixed potential having an electrode area one unit less than the total area of all unit area capacitors in the gate device and having said initial polarization, said single ferroelectric capacitor being switched upon the electrical conditioning of all of the conductors connected to its associated unit area capacitors, and means for simultaneously setting all of said capacitors to said initial polarization.

8. A decoding arrangement as defined in claim 7 wherein all of said ferroelectric capacitors in a gate device utilize a single slab of ferroelectric material for their dielectric.

References Cited in the file of this patent

UNITED STATES PATENTS

| | | |
|---|---|---|
| 2,695,396 | Anderson | Nov. 23, 1954 |
| 2,784,396 | Kaiser et al. | Mar. 5, 1957 |
| 2,798,667 | Spielberg et al. | July 9, 1957 |
| 2,843,841 | King | July 15, 1958 |
| 2,854,590 | Wolfe | Sept. 30, 1958 |
| 2,872,661 | Young | Feb. 3, 1959 |

FOREIGN PATENTS

| | | |
|---|---|---|
| 204,786 | Australia | Dec. 12, 1956 |